United States Patent [19]

Wright

[11] 4,090,214

[45] May 16, 1978

[54] ALTERNATING LINE VIDEO RECORDER/REPRODUCER

[75] Inventor: Charles Edward Wright, Escondido, Calif.

[73] Assignee: Eastman Technology, Inc., Rochester, N.Y.

[21] Appl. No.: 695,888

[22] Filed: Jun. 14, 1976

[51] Int. Cl.² .............................................. H04N 5/76
[52] U.S. Cl. ......................................... 358/4; 358/14
[58] Field of Search .................. 358/4, 14, 12; 360/24

[56] References Cited

U.S. PATENT DOCUMENTS

| 3,793,478 | 2/1974 | Verhoeven | 358/12 |
| 4,003,077 | 1/1977 | Hickok | 358/4 |

FOREIGN PATENT DOCUMENTS

| 2,342,167 | 2/1974 | Germany | 358/4 |

Primary Examiner—Richard Murray
Assistant Examiner—Aristotelis M. Psitos
Attorney, Agent, or Firm—Robert F. Cody

[57] ABSTRACT

Color video recording apparatus is known wherein, for purposes of bandwidth compression, luminance information and chrominance information is alternately recorded for the transmitted lines of a television picture frame. Upon playback a video signal is reconstructed for each line by combining the signal recorded for that line (luminance or chrominance) with the signal recorded for the preceding line (chrominance or luminance). Rather than leave half of the lines of the recorded television picture frame void of luminance information, the present invention, through recognition and correction of an inefficiency in the alternating line recording scheme described above, enables the "gaps" in luminance information to be filled in with narrow bandwidth luminance information at no increase in the bandwidth handling requirements of the recording system. In one embodiment of the invention, wide bandwidth luminance information is recorded for every other line of a television picture frame while narrow bandwidth luminance plus chrominance information is recorded for the remaining lines. To utilize this recorded information, a video signal is reconstructed upon playback by combining the signal recorded for a given line with a complementary portion of the signal recorded for the previous line.

2 Claims, 6 Drawing Figures

PLAYBACK CONFIGURATION

VIDEO SPECTRUM

|  | LUMINANCE | | CHROMINANCE | |
|---|---|---|---|---|
| LINE | ODD | EVEN | ODD | EVEN |
| 1 | $L_{W1}$ | | | |
| 2 | | $L_{N2}$ | | $C'_2$ |
| 3 | $L_{N3}$ | | $C'_3$ | |
| 4 | | $L_{W4}$ | | |
| 5 | $L_{W5}$ | | | |
| 6 | | $L_{N6}$ | | $C'_6$ |
| 7 | $L_{N7}$ | | $C'_7$ | |
| 8 | | $L_{W8}$ | | |
| 9 | $L_{W9}$ | | | |
| 10 | | $L_{N10}$ | | $C'_{10}$ |
| 11 | $L_{N11}$ | | $C'_{11}$ | |
| 12 | | $L_{W12}$ | | |
| 13 | $L_{W13}$ | | | |
| 14 | | $L_{N14}$ | | $C'_{14}$ |
| 15 | $L_{N15}$ | | $C'_{15}$ | |
| 16 | | $L_{W16}$ | | |
| 17 | $L_{W17}$ | | | |
| 18 | | $L_{N18}$ | | $C'_{18}$ |
| 19 | $L_{N19}$ | | $C'_{19}$ | |

RECORDED INFORMATION BY LINE

FIG. 3

| LINE | RECORDED |
|---|---|
| 1 | $L_{W1}$ |
| 2 | $L_{N2} + C_2$ |
| 3 | $L_{N3} + C_3 + \overline{L}_{W1}$ |
| 4 | $L_{W4} + C_2$ |
| 5 | $L_{W5} + C_3$ |
| 6 | $L_{N6} + C_6 + \overline{L}_{W4}$ |
| 7 | $L_{N7} + C_7 + \overline{L}_{W5}$ |

RECONSTRUCTED VIDEO SIGNAL

FIG. 4

PLAYBACK CONFIGURATION

ALTERNATING LINE VIDEO RECORDER/REPRODUCER

BACKGROUND OF THE INVENTION

1. Field of the Invention

The present invention relates to a color video recorder/reproducer wherein wide bandwidth luminance information is alternately recorded with narrow bandwidth luminance plus chrominance information for the lines of a television picture frame. Upon playback, a video signal is reconstructed by combining the signal recorded for a given line with a complementary portion of the signal recorded for the preceding line.

2. Description of the Prior Art

This application is related to U.S. Patent Application Ser. No. 661,204, filed Feb. 25, 1976 by William Kelsey Hickok and of common assignee. One of the most troubling aspects of color video recording is the relatively large bandwidth needed to record a standard color video signal. Even allowing for acceptable bandwidth attenuation, a minimum bandwidth recording capability of about 4.5 MHz is required. A recording system for handling a signal having information contained in frequencies from about 30 Hz to 4.5 MHz (as in a typical color video signal) is almost unthinkable from an equalization standpoint alone. For example, it is well known that the gap effect causes an increase in head response of about 6 db per octave as frequency increases until a maximum response is reached, at which point the response rapidly drops off to zero. A signal extending from 30 Hz to 4.5 MHz covers over 17 octaves; and a head designed for maximum response at 4.5 MHz will have its response down by more than 100 db at 30 Hz. Such a response range is far too great to be corrected by conventional equalization means.

There are two avenues of approach one may follow to get around the equalization problem. One approach is to frequency shift the video signal to a higher frequency range. The shift can be accomplished using an FM recording system or a direct recording system. In an FM recording system, the video signal may be used to frequency modulate a carrier having a center frequency of about 6 MHz, thus producing sidebands extending from about 1.5 MHz to 10.5 MHz. Such a frequency range represents a range of about three octaves and equalization is easily accomplished. (Generally, equalization may not be necessary in FM recording systems, since amplitude variations, so long as they are not too severe, are completely eliminated in the FM detection process.) In a direct recording system, the video signal can be shifted "as is" to occupy a frequency range from about 1 MHz to 5.5 MHz; again resulting in a range of about three octaves and presenting little problem from an equalization standpoint.

From a cost viewpoint, however, the outlook is not as promising. Both the FM and direct recording systems described above require the handling of a signal containing relatively high frequencies; as high as 5.5 MHz in the direct recording system and 10.5 MHz in the FM recording system. To record high frequencies, it is necessary to provide a high tape-to-head speed. And not only must high frequencies be recorded and reproduced but, importantly, they must be exactingly reproduced. Even seemingly insignificant amounts of time base error may show up as horizontal jitter, bending, or smearing. The cost of apparatus of generate the high tape-to-head speed, and the cost of control systems to ensure the high degree of time base stability which is so crucial, can be impressively high. To provide a video recorder/reproducer suitable for "home" use would seem to require another approach.

The other avenue of approach to the equalization problem is to obviate the necessity for recording high frequencies by narrowing the bandwidth of the recorded signal. For example, if the video signal could be made to occupy a bandwidth of 2 MHz, such a signal could be recorded in a frequency range extending from 0.5 MHz to 2.5 MHz (assuming a direct recording system). Since this frequency range represents only about three octaves, the head response may be equalized in a conventional manner. Further, the highest frequency to be recorded is only 2.5 MHz, thereby enabling a tape-to-head speed of one-half that of the direct recording system and one-fourth that of the FM recording system previously described.

U.S. Pat. No. 3,255,303 discloses a method of reducing the bandwidth of the recorded video signal. The method is based upon the realization that the color video signal, as transmitted, contains more information than is absolutely necessary for an acceptable picture. The patent relates to a television signal transmission system wherein luminance information is alternately recorded with chrominance information for each line of a television picture field. The video signal thus recorded contains only about half the information content of the original video signal and can, therefore, be made to occupy a bandwidth about one-half as wide as the bandwidth of the original video signal. The video signal thus recorded cannot be transmitted to a television receiver without some processing; otherwise, each line of the transmitted field would contain only luminance or chrominance information, never both. The resultant picture would be unacceptable both with respect to monochrome and color picture quality. In an attempt to produce an acceptable picture, a video signal for transmission is reconstructed wherein a given line comprises its recorded luminance (or chrominance) information plus the chrominance (or luminance) information of the preceding line.

A video recorder was "breadboarded" embodying an alternating line recording technique akin to the recording scheme disclosed in U.S. Pat. No. 3,255,303, above. In this breadboard system, luminance information was recorded for the first transmitted line, chrominance information for the next transmitted line, etc. The recorded video signal thus contains luminance information for lines 1, 5, 9 . . . 525 in the odd line field and lines 4, 8, 12 . . . 524 in the even line field. There is a "gap" of luminance information for lines 2 and 3, 6 and 7, etc. If these luminance gaps are not filled in, the reproduced picture display appears to have been stripped of luminance information for every other line pair. To fill in the luminance gaps, a video signal is reconstructed wherein whatever information is recorded for one line is delayed and added to the next line. In this manner, line 6, for example, contains the old luminance information held over from line 4 and line 7 contains the old luminance information held over from line 5. The luminance gaps are therefore filled in with old luminance information (in an analogous manner, chrominance gaps are filled in with old chrominance information). While using old luminance information is better than leaving luminance gaps, luminance information from line 1 (delayed and played back with line 3) is nevertheless juxtaposed with luminance information for line 4, and similarly for lines 5 and 8, 9 and 12, etc., thereby resulting in a picture which, when viewed, displays an irritating amount of vertical aberration. Since using old luminance information is apparently the only way of filling in the luminance gaps, and since using old luminance information makes for an irritating picture display, it seems that a video recorder/reproducer employing the alternating line recording scheme has an inherent incapability of producing a television picture of acceptable quality.

SUMMARY OF THE INVENTION

While recording all of the luminance and chrominance information of the prior art alternating line recording system described above, the present invention provides for a video recorder/reproducer of the alternating line recording type which records and utilizes even more luminance information, and at no change in the bandwidth handling requirements. The present invention recognizes a basic inefficiency and modifies the alternating line recording concept to correct the inefficiency. Practice of the invention enables the luminance gaps to be filled in not by "old" luminance information as is done in the prior art but, rather, by "fresh" luminance information recordable at no extra cost. Rather than record luminance information alternately with chrominance information for the transmitted lines of a television signal, a video recorder/reproducer in accordance with the invention records wide bandwidth luminance information alternately with narrow bandwidth luminance plus chrominance information. Through special signal selection and processing, the narrow bandwidth luminance plus chrominance information is made to occupy the same bandwidth as the wide bandwidth luminance information, thereby providing maximum efficiency in the utilization of the bandwidth handling capabilities of the video recorder/reproducer.

Upon playback, the video signal must be carefully reconstructed; the information recorded for one line cannot be merely delayed and added to the next line, since each line now has some luminance information, either narrow or wide bandwidth, recorded therefor. In one embodiment of the invention, a video recorder/reproducer so reconstructs the video signal that only a complementary portion of information recorded for a given line is delayed and added to the next line. A resultant picture display possesses neither the "comb" effect nor the irritating vertical aberration described above.

BRIEF DESCRIPTION OF THE DRAWINGS

In the detailed description of the preferred embodiments of the invention presented below, reference is made to the accompanying drawings, in which:

FIGS. 3 and 4 are tables useful in teaching the concept inherent in the invention;

DESCRIPTION OF THE PREFERRED EMBODIMENTS

Figure 1:
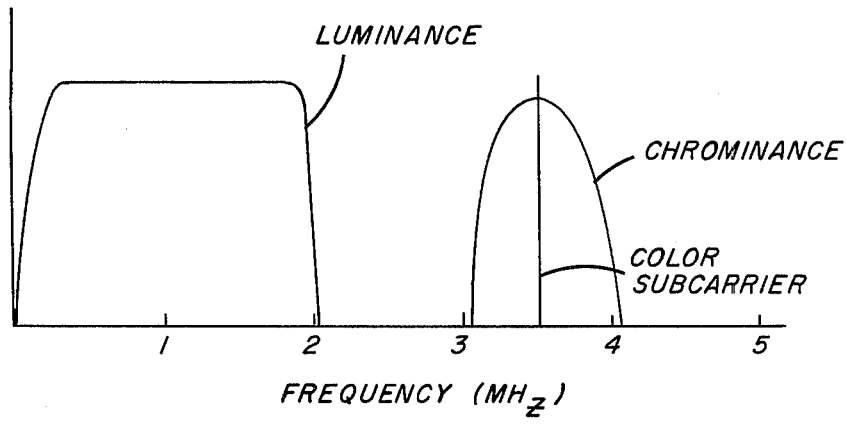
FIG. 1 shows the frequency spectrum of a video signal.

The concept of the present invention is applicable to various types of video recording systems. For sake of definiteness, the present discussion assumes a color television picture signal having a video spectrum as shown in FIG. 1. The luminance information is in the form of an amplitude varying signal having a bandwidth from about 30 Hz to 2 MHz. Chrominance information is contained on a color subcarrier having a frequency of about 3.58 MHz (3.579545) and a bandwidth of about 1 MHz. The video signal shown in FIG. 1 does not represent the entire transmitted video signal, but rather represents a video signal containing only what information is generally considered necessary to produce an acceptable picture. Luminance information above about 2 MHz is ignored, as are the higher frequency components of the chrominance information. A video signal of the type shown in FIG. 1 and described above is common in recording systems of the direct record type. In such systems, the luminance information is recorded as an amplitude varying signal while the chrominance information is recorded on a color subcarrier. Depending upon the particular direct record system more, or less, of the luminance and chrominance signals may be made use of. In the present discussion, a luminance bandwidth of about 2 MHz and a chrominance bandwidth of about 1 MHz are chosen somewhat arbitrarily and the present invention is not limited thereto.

Figure 2:
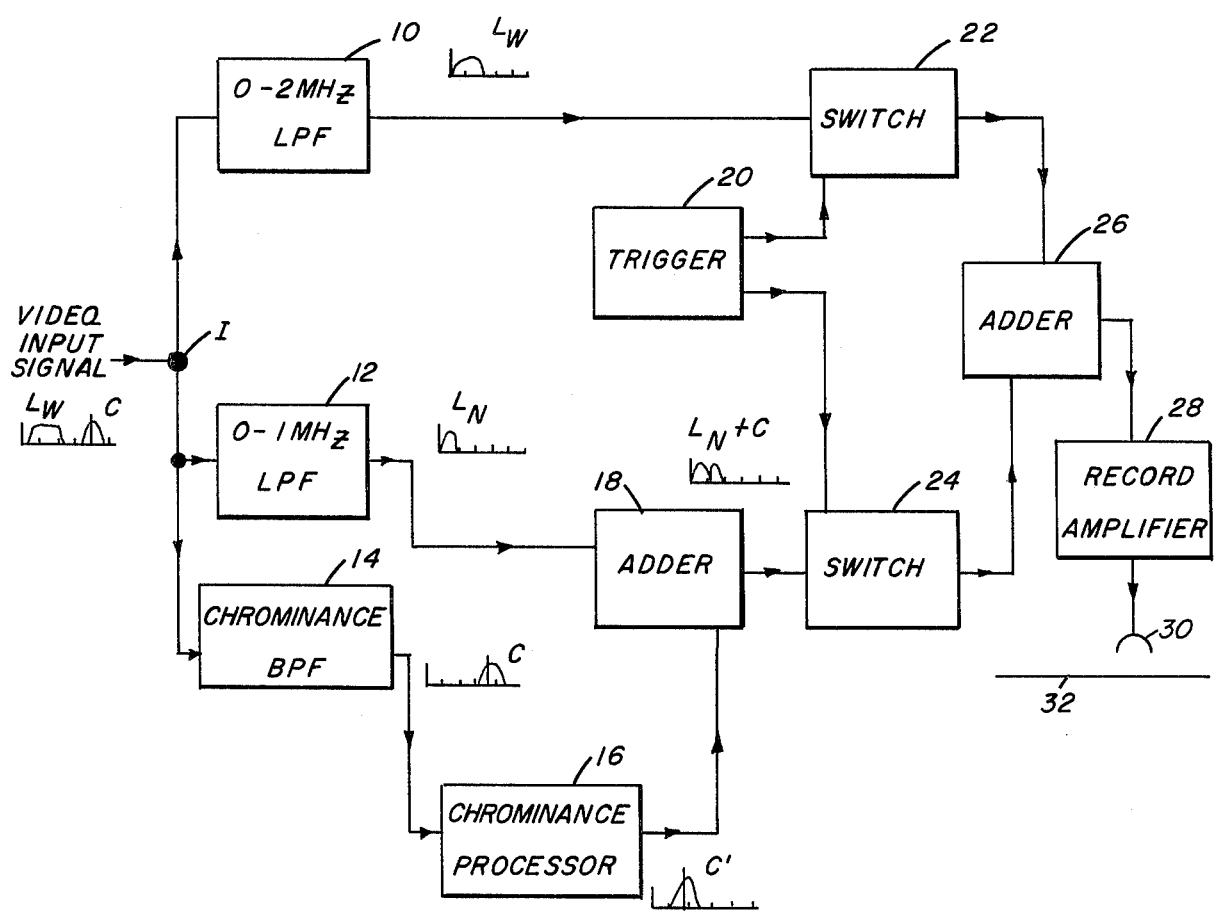
FIG. 2 is a block diagram of a record configuration representing an embodiment of the present invention.

Referring to FIG. 2, one embodiment of the present invention will now be discussed. A video input signal, having the form discussed in connection with FIG. 1, is applied to a junction I. A portion of the video signal passes through a 0 to 2 MHz low pass filter (LPF) 10 which has the effect of blocking the chrominance and passing the 2 MHz wide band of luminance information, $L_W$. Another portion of the video signal passes through a 0 to 1 MHz LPF 12 which permits only a 1 MHz wide band of luminance information, $L_N$, to pass. ($L_W$ represents the "wide" bandwidth luminance signal extending from 0 to about 2 MHz and $L_N$ represents the "narrow" bandwidth portion of the luminance signal extending from 0 to about 1 MHz.) A final portion of the video signal passes through a chrominance band pass filter (BPF) 14 with the result that the chrominance signal, C, is passed while the luminance signal is blocked. Up to this point, $L_N$ (occupying a bandwidth from 0 to 1 MHz) and C (occupying a bandwidth from about 3.1 to 4.1 MHz) are separated by about 2.1 MHz. A chrominance processor 16 is provided to frequency convert the color subcarrier from 3.58 MHz to about 1.5 MHz, thereby causing the chrominance signal C to occupy a bandwidth extending from about 1 to 2 MHz. The chrominance signal so converted is labeled $C'$. $L_N$ and $C'$ are combined in an adder 18 to form a composite signal $L_N + C'$ having an overall bandwidth extending from 0 to 2 MHz. There is now a certain symmetry between $L_W$ and the combination $L_N + C'$. Both signals occupy a bandwidth extending from about 0 to 2 MHz. Thus, either $L_W$ or $L_N + C'$ can be recorded by a system having a 2 MHz bandwidth recording capability. In effect, two signals, each having one-half the bandwidth of the original video signal (FIG. 1), have been constructed. While both signals could be recorded on separate tracks of a record medium "as is", little is gained as twice as much record medium is required. It is well known that the bandwidth handling requirements of a system can be halved by recording on two tracks instead of one. Here, the signals $L_W$ and $L_N + C'$ have been constructed for a different reason.

Each picture frame is composed of lines (525 in American sets). The lines represent an odd field containing the odd lines (1, 3, 5 ... 525) and an even field containing the even lines (2, 4, 6 ... 524). Each field is completely scanned in 1/60 of a second to produce a frame rate of 30 per second. It is known that the information content of adjacent transmitted lines is usually very similar. Thus, it has been proposed to alternately record luminance information for one line, chrominance information for the next line, and so on. Upon playback, the video signal is reconstructed to comprise, for each line, the information originally recorded for that line plus the information recorded from the previous line (as in U.S. Pat. No. 3,255,303, above). Thus, every reconstructed line has both luminance and chrominance information. As explained above, such a recording scheme, while accomplishing the desired goal of reducing the bandwidth requirements by about one-half without an accompanying increase in the amount of record medium needed to record a given program, results in obnoxious vertical aberration.

It is tempting to abandon this approach altogether, since there appears to be no way to eliminate the irritating vertical aberration, since it arises inevitably from not recording luminance information for every line. If luminance information were recorded for every line, utilizing prior art teachings, a larger bandwidth capability would be required. But this defeats the entire purpose of the alternating line recording concept which is to enable a smaller bandwidth capability to be used. The present invention, strangely enough, utilizes the alternating line recording concept, records luminance information for every line of a transmitted television signal, and yet requires no change in the bandwidth capability. These seemingly contradictory results are made possible through recognition and correction of an inefficiency in prior art alternating line recording schemes. The present invention recognizes a disparity between the bandwidth occupied by the luminance signal and the chrominance signal. The luminance signal occupies a bandwidth of about 2 MHz (FIG. 1) while the chrominance signal only occupies a bandwidth of about 1 MHz. Since the recording channel must be built to handle the luminance signal, it must have a recording capability of at least 2 MHz. Therefore, for those lines where chrominance information alone is being recorded, there is an extra 1 MHz in bandwidth recording capability which is being wasted. In light of this realization, it becomes apparent why the signals $L_W$ and $L_N+C'$ were constructed. In effect, the information contained in $L_N$ can be recorded at no extra cost.

To alternately record the signals $L_W$ and $L_N+C'$, a pair of switches 22 and 24, activated by a trigger 20, are employed. The trigger 20 generates a trigger signal, causing the switch 22 to assume a closed position for the duration of one horizontal scan line, about 63.5 us, thereby permitting the luminance signal $L_W$ for that line to be passed by the switch 22 to an adder 26. Concurrently, the switch 24 assumes an open position, thereby preventing the signal $L_N+C'$ from passing to the adder 26. At the termination of a horizontal scan line, and for the duration of the next horizontal scan line, the trigger 20 generates another trigger signal, causing the switch 24 to assume a closed position and the switch 22 to be open. Now the signal $L_N+C'$ is passed by the switch 24 to the adder 26 and the luminance signal $L_W$ is blocked by the switch 22. The trigger 20 and the switches 22 and 24 continue operating in this "flip-flop" sequence. The output signal from the adder 26 thus comprises the signal $L_W$ for one line, the signal $L_N+C'$ for the next line, and so on. This output signal is fed to a record amplifier 28 which provides the necessary amplification to drive a recording head 30 to record the signal on a record medium 32.

FIG. 3 shows in tabular form the recorded signals for the first 19 lines of a picture frame. The recorded information is broken down into luminance and chrominance information and, further, by odd and even fields. As seen from FIG. 3, line 5 of the picture frame, an odd field line, has wide bandwidth luminance information, $L_{W_5}$, recorded. Line 6, an even field line, has narrow bandwidth luminance information, $L_{N_6}$, plus the full chrominance information $C'_6$; and so on for the remaining lines. It should be realized that, since the odd field lines are transmitted sequentially, and then the even field lines; the alternating line recording technique described in connection with FIG. 2 results in the recording of chrominance information, $C'$, for a pair of adjacent lines (e.g., lines 6 and 7) and no recorded chrominance information for the next pair of lines (e.g., lines 8 and 9). Similarly, wide bandwidth luminance information, $L_W$, is recorded for one pair of adjacent lines (e.g., lines 4 and 5) while narrow bandwidth luminance information, $L_N$, is recorded for the next pair of lines (e.g., lines 6 and 7). This "pairing" pattern of recorded information arises because adjacent lines in the transmitted signal (say, odd field lines) appear as alternate lines (interlaced with even field lines) in the displayed picture frame.

Absent the present invention, this "pairing" effect is what produces the unacceptable vertical aberration found in the breadboard video recorder previously described. Implementing the invention fills in luminance information, in particular the low bandwidth luminance information $L_N$, which would otherwise not be present. Imagine the table of recorded information shown in FIG. 3 with every $L_N$ erased. There would be gaps in the recorded luminance information for every other pair of lines, i.e., lines 2 and 3, 6 and 7, 10 and 11, etc. But the present invention adds actual luminance information from those lines at no increase in bandwidth handling requirements and no increase in the amount of record medium needed to record a given program.

It will be noted that the frequency band of the recorded signals ($L_W$ and $L_N+C'$) extends from about 0 to 2 MHz. There is nothing sacrosanct about this particular frequency band; a frequency band extending from, for example, 0.5MHz to 2.5 MHz will do equally well. In fact, as previously discussed, the latter frequency band has an advantage over the former frequency band in that only a 3 octave range is spanned as opposed to a 16 octave range. The frequency band of 0 to 2 MHz is chosen merely for convenience and for purposes of illustration, the frequency band most desirable being dependent upon the particular application. What is important, however, is that the bandwidth of the recorded signals is "compressed", from about 4 MHz (the bandwidth of the video signal shown in FIG. 1) to about 2 MHz (the bandwidth of $L_W$ and $L_N+C'$).

Since luminance information is recorded for every line in the picture frame (either full bandwidth luminance $L_W$ or low bandwidth luminance $L_N$), it may be expected that vertical aberration in the luminance portion of the picture will be reduced. The gaps in the chrominance information still remain, however, and it is not clear exactly what effect these gaps will have upon the total picture. In addition, there are several ways in which a video signal can be reconstructed from the recorded information (FIG. 3) and, since picture quality is largely a subjective phenomenon, predictions generally cannot be made as to which of the reconstructed signals will yield a picture of acceptable quality, if any. It thus remains to experiment by building apparatus for the reconstruction of the video signal and to view a picture thus produced.

Perphaps the most straightforward reconstruction of the video signal is to play back the recorded signal "as is". Such a reconstructed video signal has improved vertical aberration, due to the low bandwidth luminance information $L_N$, and pastel colors are acceptable. Primary colors such as red, however, tend to be less acceptable. For example, a red strip appears as a pair of red lines alternating with a pair of gray lines (the pairing effect of the chrominance information discussed above). Notwithstanding relatively poor quality primary colors, such a system represents a substantial improvement over the "breadboard" recorder described above.

In a preferred embodiment of the present invention, information recorded for one line of the picture frame is combined with complementary information recorded from the previous line (the order of the lines is the order in which they are transmitted, not how they appear on a screen). For example, line 4 has recorded wide bandwidth luminance information, $L_{W_4}$ (FIG. 3), and line 2 has recorded narrow bandwidth luminance information, $L_{N_2}$, plus chrominance information $C'_2$. The complementary information from line 2 which is added to line 4 is the chrominance information $C'_2$ frequency converted back to its original frequency range, $C_2$. Therefore, line 4, after reconstruction, will contain the signal $L_{W_4}+C_2$. Upon playback of all lines similar to line 4, circuitry must be provided to separate $C'_2$ from $L_{N_2}$, frequency convert $C'_2$ to $C_2$, and combine $C_2$ and $L_{W_4}$.

Reconstruction of line 6 is based upon the same principle but is slightly more involved. Line 6 contains narrow bandwidth luminance information, $L_{N_6}$, and chrominance information, $C'_6$ (FIG. 3). Line 4 contains wide bandwidth luminance information, $L_{W_4}$. The complementary portion of $L_{W_4}$ which is added to $L_{N_6}+C'_6$ is the high frequency portion contained in $L_{W_4}$ outside of the bandwidth range of $L_{N_6}$. As discussed, the narrow bandwidth luminance signals occupy bandwidths extending from 0 to 1 MHz. The wide bandwidth luminance signals occupy bandwidths extending from 0 to 2 MHz. Therefore, the luminance information of $L_{W_4}$ contained in a bandwidth extending from 1 to 2 MHz is separated and added to $L_{N_6}$ to produce a reconstructed luminance signal having a bandwidth extending from 0 to 2 MHz. Designating the portion of $L_{W_4}$ having frequencies from 1 to 2 MHz as $\bar{L}_{W_4}$, the entire reconstructed signal for line 6 is $(L_{N_6}+\bar{L}_{W_4})+C'_6$. Reconstruction of the video signal for other lines is analogous, and FIG. 4 shows the reconstructed video signal for the first 7 lines of the picture frame.

Figure 5:
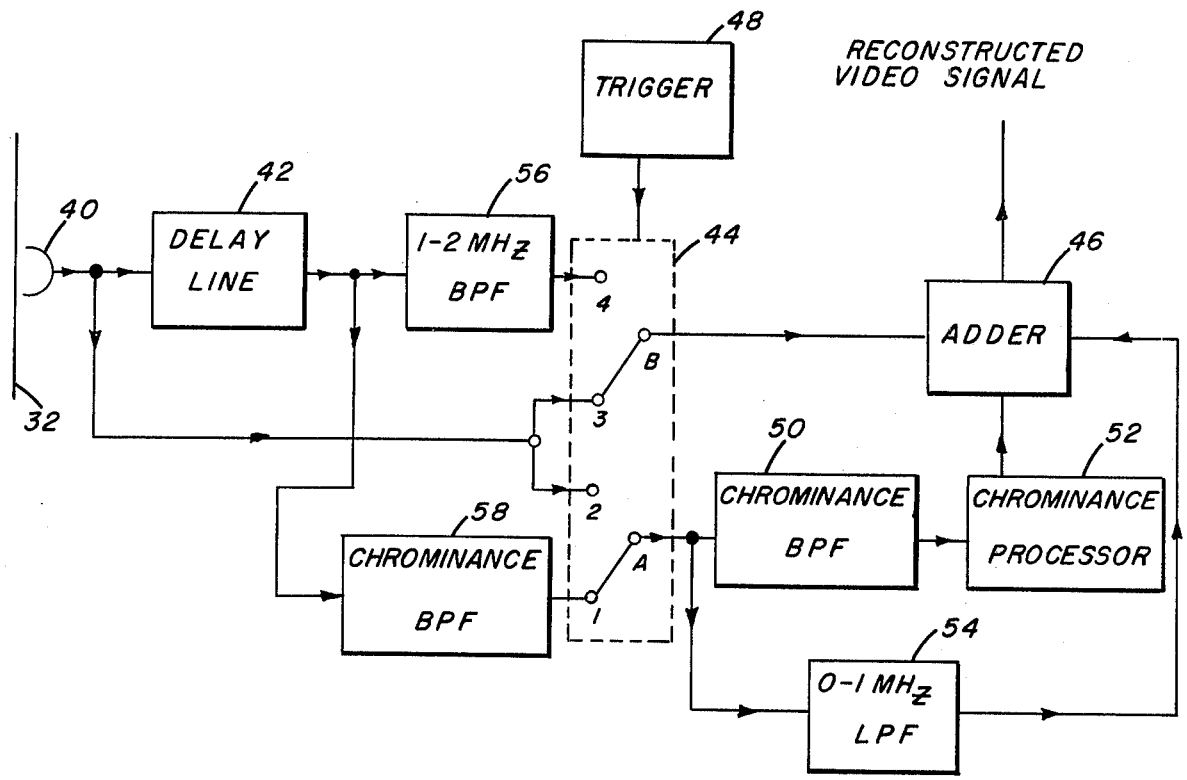
FIG. 5 is a block diagram of a playback configuration in accordance with a preferred embodiment of the invention.

One possible playback configuration which effects the reconstruction of the video signal is described above and is shown in FIG. 5. A playback head 40 senses the recorded signal on the record medium 32. Assume line 1 is being played back. The signal recorded on line 1 is applied to a delay line 42 which provides a time delay equal in duration to one horizontal scan line (63.5 us) and also is applied to terminals 2 and 3 of a switch 44. The switch 44 has two poles designated as pole A which switches between terminals 1 and 2 and pole B which switches between terminals 3 and 4. The signal played back for line 1 is $L_{W_1}$ and is passed via pole B to an adder 46. As no signal has yet reached terminal 1 of the switch 44, the reconstructed video signal for line 1 is $L_{W_1}$ (FIG. 4). As the playback head 40 senses the signal recorded for the next line (line 3), a trigger 48 generates a trigger signal, causing pole A to contact terminal 2 and pole B to contact terminal 4. Applied to terminal 2 is the signal recorded for line 3, i.e., $L_{N_3}+C'_3$. The signal $L_{N_3}+C'_3$ is thus applied to a chrominance BPF 50, which passes $C'_3$ to a chrominance processor 52, and to a luminance LPF 54 which passes $L_{N_3}$ to the adder 46. The chrominance processor 52 frequency converts the color subcarrier (which was down converted by the chrominance processor 16 in FIG. 2 prior to recording) to a frequency of 3.58 MHz, its original frequency. The converted chrominance signal $C_3$ is applied to the adder 46. Since the delay line 42 introduces a time delay equal in duration to one horizontal scanning line, the signal from the previous line, line 1, now appears at terminal 4 modified by a BPF 56. The BPF 56 passes only those frequencies of $L_{W_1}$ between 1 and 2 MHz, thereby forming $\bar{L}_{W_1}$ which is passed via pole B to the adder 46. Thus, for line 3, the reconstructed video signal comprises $(L_{N_3}+\bar{L}_{W_1})+C_3$, in agreement with FIG. 4.

Similarly, at the beginning of line 5, the trigger 48 switches pole A back to terminal 1 and pole B to terminal 3. The signal recorded for line 5, $L_{W_5}$, is applied directly to terminal 3 and passed via pole B to the adder 46. The signal recorded for line 3, $L_{N_3}+C'_3$, is now applied via the delay line 42 to terminal 1 after being modified by a chrominance BPF 58. The effect of the chrominance BPF 58 is to convert $L_{N_3}+C'_3$ into $C'_3$, i.e., only $C'_3$ is passed by the chrominance BPF 58 and applied to terminal 1. Thus, $C'_3$ gets frequency converted (now becoming $C_3$) to its original frequency range by the chrominance processor 52 and is then applied to the adder 46. The reconstituted video signal for line 5 is, therefore, $L_{W_5}+C_3$. It is thus seen that the playback configuration reconstructs the video signal in accordance with the reconstructed signals tabled in FIG. 4.

A video signal so reconstructed contains both luminance and chrominance information for every line. In the case of the luminance information, at least a portion represents the actual information transmitted in each line. For those lines wherein only narrow bandwidth luminance information was recorded, a complementary portion of the wide bandwidth luminance information delayed from the previous line has been added. The luminance portion of a picture generated from such a reconstructed video signal appears very acceptable and is an improvement over the more straightforward reconstruction scheme previously considered.

Figure 6:
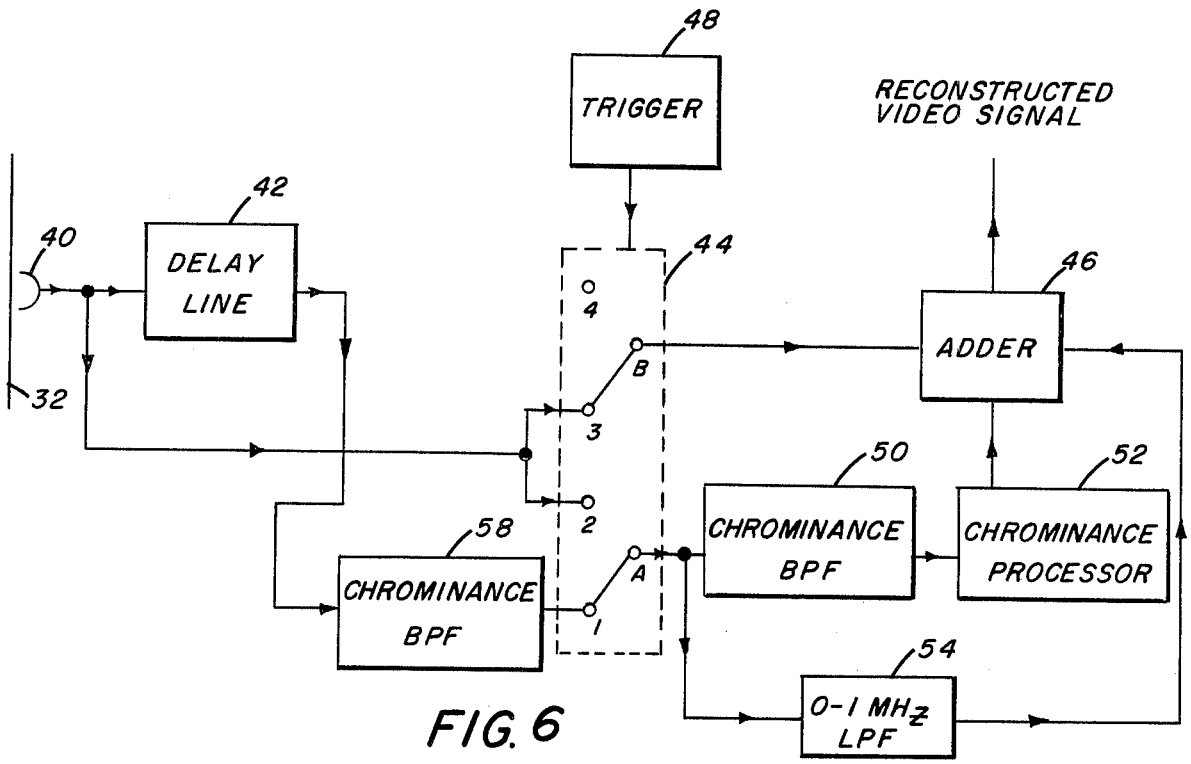
FIG. 6 is a block diagram illustrating an alternate embodiment of the present invention.

Another, and viable, reconstruction of the video signal is produced by the circuit of FIG. 6. The general circuit is similar to FIG. 5 with the exception that the 1 to 2 MHz BPF 56 is eliminated and the terminal 4 of the switch 44 is not connected. The effect of the modification is only noticed when the signal applied to the terminals 2 and 3 of the switch 44 is the narrow bandwidth luminance plus chrominance signal. (At all other times, the pole B is switched to the terminal 3 and the 1 to 2 MHz BPF 56 is switched out of the circuit, anyway.) In this case, pole B is switched to the terminal 4 and, since the terminal 4 has no other connection, the only signal passing through the switch 44 is the narrow bandwidth luminance plus chrominance signal. Thus, a video signal is reconstructed comprising, for lines wherein the wide bandwidth luminance signal was recorded, the wide bandwidth luminance signal originally recorded plus the chrominance signal recorded for the preceding line. And for those lines wherein the low bandwidth luminance signal plus the chrominance signal were originally recorded, the reconstructed video signal comprises the originally recorded signal itself, i.e., no complementary portion of the wide bandwidth luminance signal has been added.

The invention has been described in detail with particular reference to preferred embodiments thereof, but it will be understood that variations and modifications can be effected within the spirit and scope of the invention. For example, the trigger 20 shown in FIG. 2 or the trigger 48 shown in FIG. 5 can be operable in response to the sync pulses contained in the video signal. In such an event, well known sync separator circuits could be employed to detect the horizontal blanking pulses for purposes of activating the various switches. As another example, the narrow bandwidth luminance signal was assumed to occupy a frequency range extending from 0 to 1 MHz. It will be apparent to those skilled in the art that the narrow bandwidth luminance signal could have been chosen to occupy various other frequency ranges such as 1 to 2 MHz. (In this case, the chrominance signal would be frequency converted to a frequency range of about 0 to 1 MHz.)

What is claimed is:

1. Apparatus for reconstructing a color television signal from signals recorded on a record medium, the recorded signals comprised of wide bandwidth luminance signal information for alternate field lines and narrow bandwidth luminance signal information plus chrominance signal information for the remaining field lines, said apparatus comprising:
    (a) means for reproducing the signals recorded on the record medium, the signals comprised of wide bandwidth luminance signal information $L_W$ alternating with narrow bandwidth luminance signal information $L_N$ plus chrominance signal information $C'$;
    (b) means for introducing a one horizontal scan line time delay to the signal reproduced from the record medium;
    (c) luminance filter means for filtering out of a signal applied thereto from said delay means the information contained in the frequency range occupied by the narrow bandwidth luminance signal thereby to produce a signal $L_W$;
    (d) chrominance filter means for filtering the chrominance signal information $C'$ from a signal applied thereto from said delay means;
    (e) signal combination means for combining the signal $C'$ from said chrominance filter means with the signal from said reproducing means whenever the signal from said reproducing means is the wide bandwidth luminance signal information $L_W$, and for combining the signal $L_W$ from said luminance filter means with the signal from said reproducing means whenever the signal from said reproducing means is the narrow bandwidth luminance signal information $L_N$ plus the chrominance signal information $C'$, whereby a color television signal is reconstructed comprising, for those field lines wherein wide bandwidth luminance signal information was recorded, the wide bandwidth luminance signal information originally recorded for that line plus the chrominance signal information recorded for the preceding line, and for those lines wherein the narrow bandwidth luminance signal information plus the chrominance signal information was recorded, the reconstructed color television signal comprises the narrow bandwidth luminance signal information and the chrominance signal information originally recorded for that line plus that portion of the wide bandwidth luminance signal information recorded for the previous line which does not overlap the frequency band of the narrow bandwidth luminance signal information.

2. Apparatus as claimed in claim 1 for reconstructing a color television signal from signals recorded on a record medium, the chrominance signal information in the recorded signals having been frequency converted before recording from an original frequency band to a frequency band substantially adjacent the frequency band occupied by the narrow bandwidth luminance signal information, wherein said signal combination means further includes means for frequency converting the chrominance signal information applied thereto to the originally occupied frequency band.

* * * * *